United States Patent
Lipin (10) Patent No.: US 9,002,902 B2
(45) Date of Patent: Apr. 7, 2015

(54) TECHNIQUES FOR CONSTRUCTING MINIMUM SUPERSETS OF TEST DATA FROM RELATIONAL DATABASES

(75) Inventor: Andrew Lipin, West Bloomfield, MI (US)

(73) Assignee: Compuware Corporation, Detroit, MI (US)

( * ) Notice: Subject to any disclaimer, the term of this patent is extended or adjusted under 35 U.S.C. 154(b) by 428 days.

(21) Appl. No.: 13/603,758

(22) Filed: Sep. 5, 2012

(65) Prior Publication Data

US 2014/0067790 A1    Mar. 6, 2014

(51) Int. Cl.
G06F 17/30    (2006.01)

(52) U.S. Cl.
CPC .............................. *G06F 17/30595* (2013.01)

(58) Field of Classification Search
None
See application file for complete search history.

(56) References Cited

U.S. PATENT DOCUMENTS

| | | | |
|---|---|---|---|
| 2007/0156736 A1* | 7/2007 | Bestgen et al. | 707/101 |
| 2008/0195649 A1* | 8/2008 | Lefebvre | 707/102 |
| 2011/0066481 A1* | 3/2011 | Vazacopoulos et al. | 705/14.13 |
| 2012/0023141 A1* | 1/2012 | Holster | 707/798 |
| 2014/0067867 A1* | 3/2014 | Pattabhi et al. | 707/792 |
| 2014/0172850 A1* | 6/2014 | Borkar et al. | 707/736 |

* cited by examiner

*Primary Examiner* — Alicia Willoughby (74) *Attorney, Agent, or Firm* — Harness, Dickey & Pierce, P.L.C.

(57) ABSTRACT

A computer-implemented method is provided for constructing a minimum superset of data that complies with referential completeness as well as other specified data relationships. Given extraction criteria for the data, an iterative process analyzes the database for records to be included in the minimal superset. The iterative process includes: selecting a given table from a listing of tables implicated by the extraction criteria; identifying tables in the relational database having either a parent or a child relationship with the given table; evaluating concurrently and asynchronously each of the identified tables; and repeating these steps for each of the tables in the listing of tables.

17 Claims, 5 Drawing Sheets

FIG. 6

TECHNIQUES FOR CONSTRUCTING MINIMUM SUPERSETS OF TEST DATA FROM RELATIONAL DATABASES

FIELD

The present disclosure relates to techniques for constructing minimum supersets of data records from relational databases.

BACKGROUND

Studies have shown that sixty percent of application development and testing time is devoted to data-related tasks. Reducing time spent on test data management is critical in controlling IT costs and keeping developers focused on the task at hand—developing new applications and managing existing ones. To design and build reliable applications today, however, entails a complex process involving a range of different and unfamiliar databases and file types. Often developers spend more time dealing with data-related issues than developing the actual application itself.

Various software applications interact with large amounts of data stored in relational databases. In order to test such applications, a smaller subset of data is frequently used; sometimes—with certain attributes modified to comply with data privacy rules. In order for such a subset to properly represent the original data, it typically must guarantee referential integrity, which can include not only the standard primary/foreign keys relationships, but also other relationships between attributes expected by the application. Often such data subsets are required to be "complete", meaning that it includes all child entries for which their parent is included into the subset. Therefore, it is desirable to provide efficient and reliable techniques for constructing minimum supersets of data that comply with referential integrity rules.

This section provides background information related to the present disclosure which is not necessarily prior art.

SUMMARY

A computer-implemented method is provided for constructing a minimum superset of data that complies with referential integrity rules as well as other specified data relationships. Given extraction criteria for the data, an iterative process analyzes the database for records to be included in the minimal superset. The iterative process includes: selecting a given table from a listing of tables implicated by the extraction criteria; identifying tables in the relational database having either a parent or a child relationship with the given table; evaluating asynchronously each of the identified tables; and repeating these steps for each of the tables in the listing of tables. The evaluation of identified tables includes determining additional records in an identified table having a referential relationship with records in the given table but do not occur in a corresponding registry table for the identified table, inserting the additional records into the corresponding registry table for the identified table and adding the additional records as a table in the listing of tables, where the registry tables store the records that are to be included in the minimum superset. Evaluating relationships between tables asynchronously and concurrently improves performance in comparison to conventional methods.

One example implementation for constructing a minimum superset of test data is as follows. Given an input data set, a listing of tables is compiled, such that each table in the listing contains data from the input data set. A bundle table is created for each of the tables in the listing of tables. Each bundle table is comprised of an identification key from a corresponding table in the listing of tables and includes applicable records from the input data set. A registry table is also created for each of the tables in the listing of tables. Each registry table is comprised of an identification key from a corresponding table in the listing of table. The iterative part of the method includes: a) selecting a given table in the listing of tables; b) removing the selected table from the listing of tables; c) determining, for the selected table, related tables having either a parent or child relationship with the selected table in the relational database; d) for each of the related tables, determining, whether a corresponding registry table has been created and creating a corresponding registry table in response to the determination that a registry table has not yet been created; e) evaluating the relationships with related tables; and repeating steps a) through e) until the listing of tables is empty.

For each table having a parent relationship with the selected table, a parent bundle table is created, identification keys from the parent bundle table are inserted into the corresponding registry table for the parent table, and the parent bundle table is added to the listing of tables, where parent bundle table includes identification keys from the parent table which do not occur in the corresponding registry table and for which there exists a record in the selected table with the foreign key matching the primary key of this record and with the identification key that exists in the corresponding bundle table for the selected table.

For each table having a child relationship with the selected table, a child bundle table is created, identification keys from the child bundle table are inserted into the corresponding registry table for the child table, and the child bundle table is added to the listing of tables, where the child bundle table includes identification keys from the child table which do not occur in the corresponding registry table and for which there exists a record in the selected table with the primary key matching the foreign key of this record and with the identification key that exists in the corresponding bundle table for the selected table.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
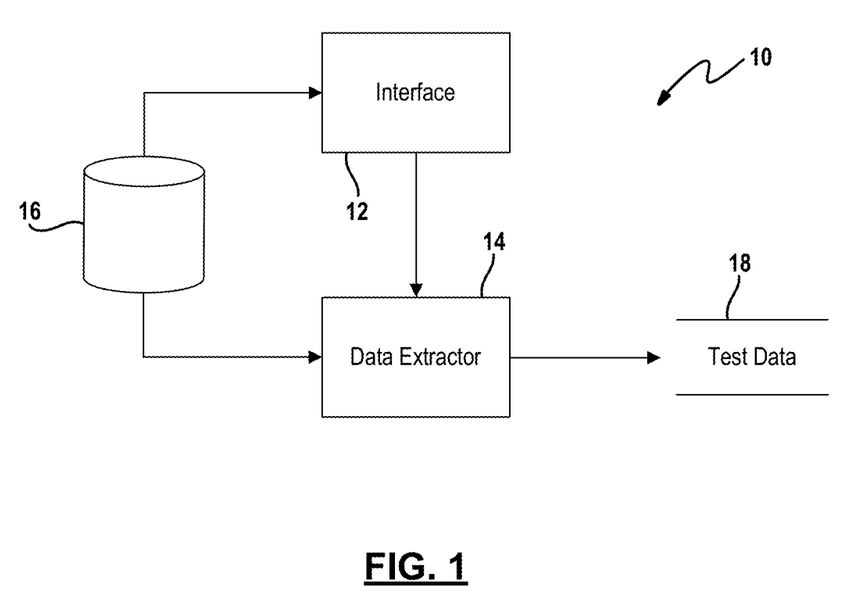
FIG. 1 is a diagram of a data management system.

FIG. 1 depicts a data management tool 10. Extracting a subset of data from a database is one common feature supported by such tools. The data may be used, for example, to test a software application. One exemplary data management tool is the File-AID data management tool commercially available from Compuware Corporation. It is readily understood that the teachings of this disclosure are applicable to other types of data management tools, including the Optim data management application from IBM.

The data management tool 10 is comprised generally of an interface module 12 and an extraction module 14. The extraction module 14 may be interfaced with one or more databases 16 and is operable to extract test data from the databases 16. The test data may be output to a file 18 or another type of data store. The interface module 12 enables a user to specify the criteria for extracting the test data. The interface module 12 may also be used to view and/or manipulate the extracted test data. The interface module 12 and the extraction module 14 are preferably executed on the same computing device that hosts the database 16 although may reside on a different computing device than the one hosting the database 16.

Figure 2:
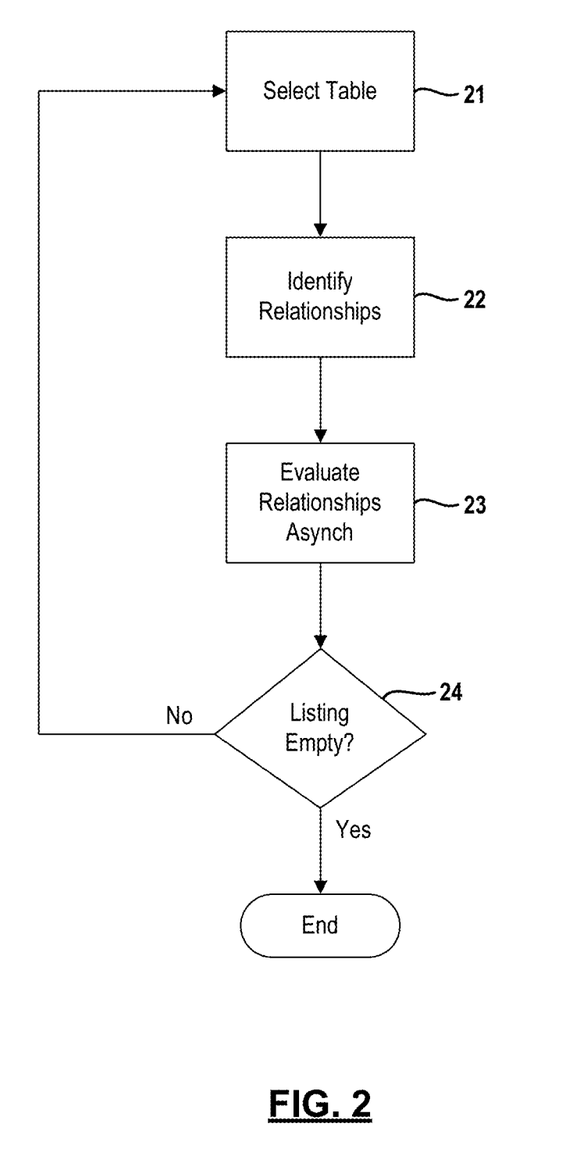
FIG. 2 is a flowchart depicting an improved method for constructing a minimum superset of test data.
Figure 3:
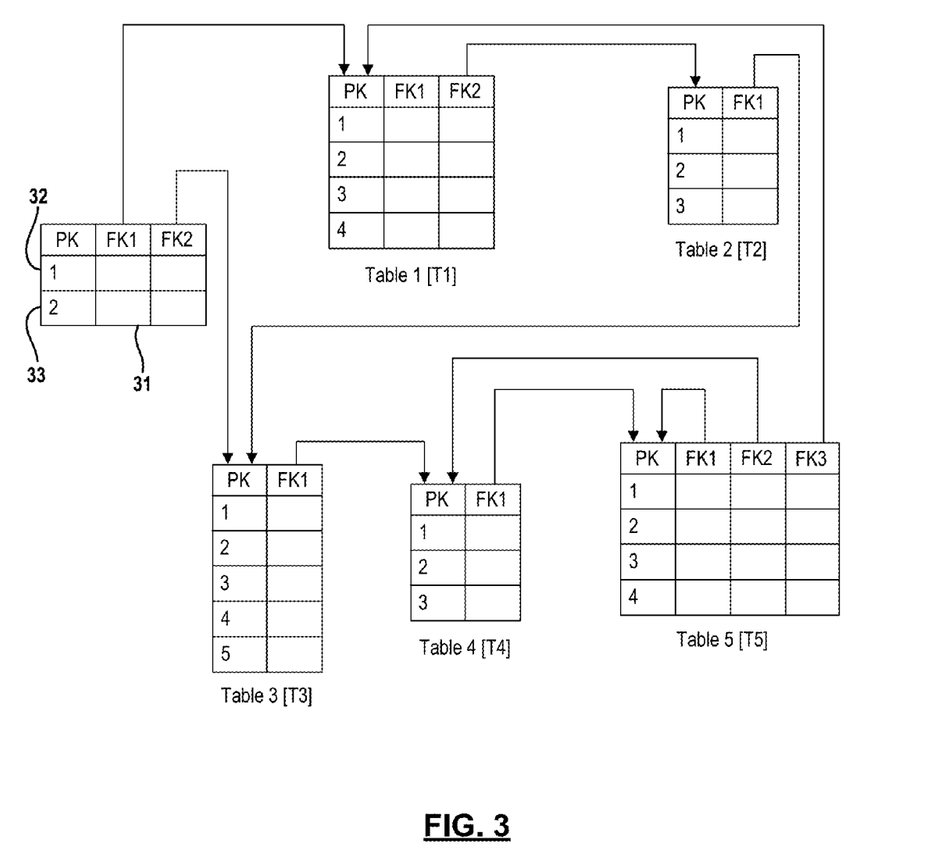
FIG. 3 is a diagram illustrating relationships between tables in a relational database.

FIGS. 2 and 3 present an improved method for constructing a minimum superset of test data for a relational database. For illustration purposes, tables are described as having primary keys that can be used to uniquely identify particular records. It is readily understood that tables may include other keys that uniquely identify records in the tables which are commonly referred to as candidate keys or identification keys. The methodology set forth below applies more generally to such identification keys. Moreover, the methodology can be adapted for tables that do not explicitly define primary keys or identification keys. In these cases, other techniques may be used to identify the records of interest in a given table, for example using the row number to identify records in the table. While reference is made throughout this disclosure to a relational database, it is envisioned that the broader aspects of this methodology may also be extended to other types of data structures.

To initiate the process, a user specifies extraction criteria for the test data using the interface module 12. Exemplary criteria may be to provide all data for customers having a last name beginning with the letter 'k'. The specified extraction criteria are in turn translated into records in one or more tables of the database. Continuing with the example criteria, records may be extracted by the interface module from a customer table in the database 16 to form an input data set. For illustration purposes, the input data set is a subset of records from a single table (referred to herein as the driving table). It is envisioned that the extraction criteria may yield records from two or more driving tables.

Records from each of the driving tables are compiled into a listing of tables which is used as input to the methodology. Moreover, subsets of records from other tables in the database can be added to the listing of tables during subsequent iterations of the process as will be further described below.

Records needed to construct a minimal superset of data that complies with referential integrity rules are exposed during an iterative process. Records that are to be included in the superset are stored temporarily in a set of tables referred to herein as registry tables. Each registry table corresponds to a table in the database. A registry table is comprised of fields identical to the identification key or primary key from the corresponding table in the database.

An iterative process begins by selecting a table at 21 from the listing of tables. Starting with a single driving table, tables having either a parent relationship or a child relationship with the driving table are identified as indicated at 22. In the example shown in FIG. 3, the driving table 31 has a child relationship with Table 1 and Table 3. Each relationship is further evaluated at 23 to determine whether any additional records should be included in the minimal superset. Records to be included in the minimal superset are those records in the identified table that have a referential relationship with records in the driving table but do not yet occur in the corresponding registry table for the identified table. Limiting the records to those in the driving table ensures that the minimal superset meets the user's specified extraction criteria.

With continued reference to FIG. 3, the driving table 31 may include two records 32, 33 having primary keys with values one and two, respectively. The driving table 31 may further include a first foreign key (FK1) that references the primary key (PK) of Table 1. In this example, the additional records to be included in the minimal superset are the records in Table 1 having a primary key that match the foreign keys of the two records in the driving table but are not yet contained in the corresponding registry table (not shown) for Table 1. Any such additional records are inserted into the registry table for the Table 1. Furthermore, these additional records are added to the listing of tables to seed further iterations. An important aspect of this approach is that each relationship may be evaluated asynchronously and concurrently. That is, the evaluation of Table 1 can be done in parallel with the evaluation of Table 3, thereby providing significant performance improvement over conventional methods.

Once the driving table has been evaluated, another table is selected and evaluated in a similar manner as indicated at 24. Continuing with the example in FIG. 3, records from Table 1 and records from Table 3 would have been added to the listing of tables. An evaluation of Table 1 leads to child relationships with Table 2 and Table 5; whereas, an evaluation of Table 3 leads to a parent relationships with Table 2 and a child relationship with Table 4. The process is repeated until each of the tables in the listing of tables has been evaluated. Note that an evaluation of Table 4 leads to additional relationships between Table 4 and Table 5. In this way, all of the relationships as well as the records implicated by these relationships are contained in the resulting minimal superset.

Figure 4:
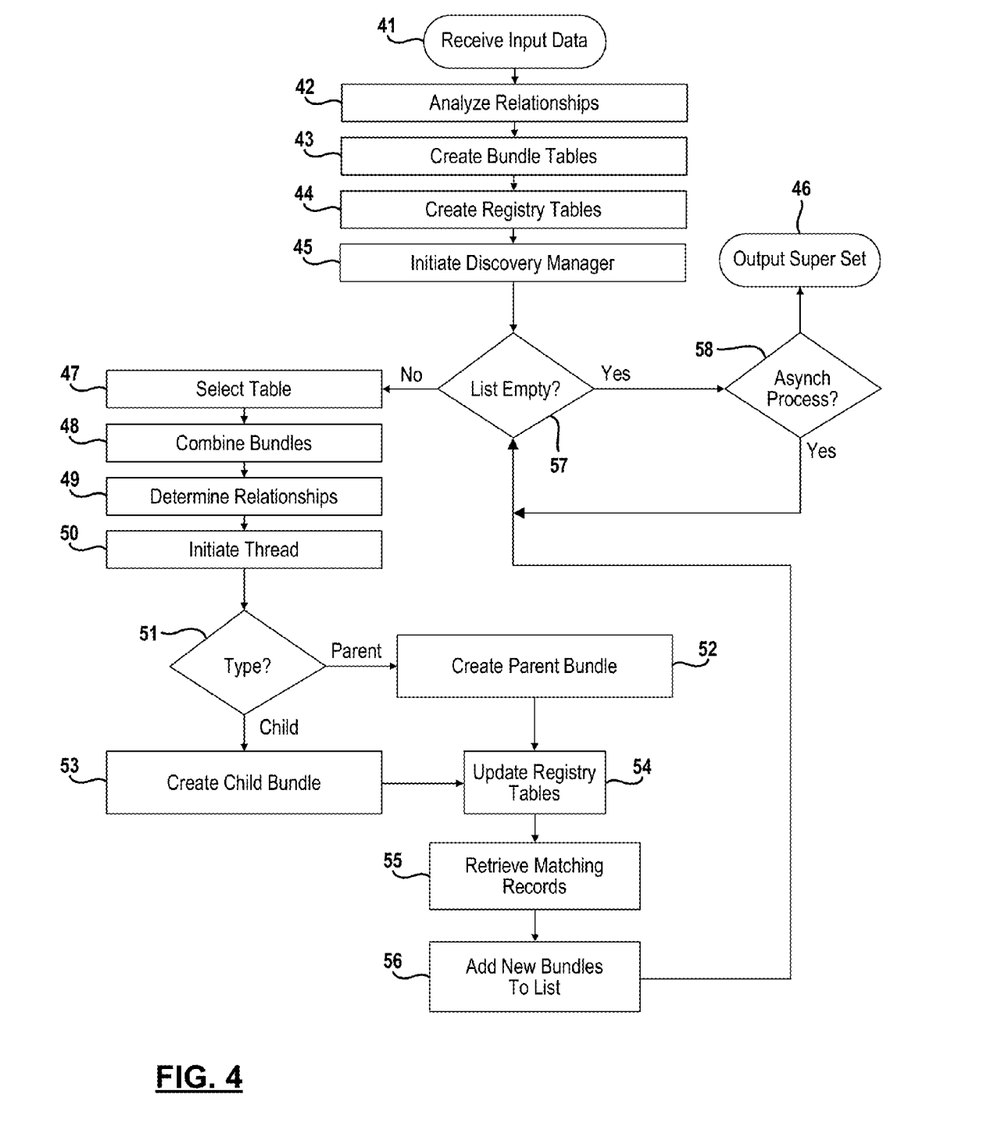
FIG. 4 is a flowchart depicting an exemplary embodiment of the methodology described in this disclosure.

FIG. 4 further illustrates an exemplary embodiment of the methodology which may be implemented by the extraction module 14. Extraction criteria for the test data is first specified using the interface module 12 as noted above. For example, a user may specify a range of records in one or more tables of the database as the extraction criteria. Each table specified in the extraction criteria is compiled into a listing of tables that will serve as an input data set to the extraction module 14 as indicated at 41.

Extraction criteria may also include relationships amongst data that is defined outside of the database, for example relationships enforced by a software application. In these instances, the relationships are analyzed at 42 to determine which, if any, other tables should be added to the listing of tables. Tables implicated by the specified relationships are then added to the listing of tables and may be accounted for in the manner set forth below.

For the tables having records specified by the extraction criteria, a bundle table is created at 43 for each of these tables. Each bundle table corresponds to a table in the database. A bundle table is comprised of an identification key or primary key from the corresponding table in the database and includes the records specified by the selection criteria. Records in the bundle tables will also serve as input to the process.

For each table in the listing of tables, a registry table is created at 44. Each registry table corresponds to a table in the database. A registry table is comprised of fields identical to the identification key or primary key from the corresponding table in the database. Registry tables store the output of the process which is in turn used to construct the minimal superset of test data. It is envisioned that registry tables may be created at the beginning of the process or subsequently during the process as needed.

A discovery manager is then initiated at 45 to discover all of the records needed to construct the minimal superset. The iterative process is driven by the listing of tables. A given table is selected from the listing of tables at 47 and then evaluated as will be further described below. Each selected table is also removed from the listing of tables. After a selected table has been evaluated, another table is selected from the listing of tables until there are no further tables in the listing of tables. The resulting registry tables define the records in a data set that complies with data integrity rules. Because the registry tables only contain the identification keys of the resulting records, the discovery manager may further query the database for the attributes associated with each record to provide a comprehensive data set.

Evaluation of a selected table begins by searching at 48 for other tables in the listing of tables that correspond to the selected table. Because tables can be added to the listing of tables during the iterative process, a given table may be enumerated more than once in the listing of tables. To reduce processing time, all of the available records from a given table should be merged together into one table and evaluated in one iteration. Alternatively, tables can be combined together during a database query (e.g., using Union All statement in SQL) in steps 52 and 53 described below. Once evaluated, each enumeration of the table should be removed from the listing of tables.

Next, tables having a parent relationship or a child relationship with the selected table are identified at 49. In the exemplary embodiment, such relationships are maintained in the database and may be discovered by querying the database. Other techniques may be employed to discover relationships in other types of data structures.

For each newly identified table, there may or may not exist a corresponding registry table. Before proceeding, a determination is made at 50 as to whether a corresponding registry table has been created for each identified table and, if not, a corresponding registry table is created for each identified table. In this way, registry tables may be created as needed. Depending on the capabilities of the database engine, the creation of registry tables can also be postponed. Rather, the algorithm is adjusted so it doesn't create the registry-related clauses in the queries before the registries are created. This approach typically has performance benefits in comparison with creating an empty registry table prior to the first use.

In the exemplary embodiment, each of the identified relationships spawns a subprocess. That is, the discovery manager initiates an execution thread at 50 for each of the identified relationship. Each identified relationship is further evaluated to determine whether any additional records should be included in the minimal superset. Tables having a parent relationship with the selected table are evaluated at 52; whereas, tables having a child relationship with the selected table are evaluated at 53.

The discovery manager provides adequate coordination between these subprocesses, such as load balancing and minimal level of synchronization. Load balancing may be implemented statically, with a number of subprocesses that can be concurrently active time pre-computed based on the physical characteristics of the database server, such as the number of processing units and amount of available memory, or dynamically, with the discovery manager taking measurements of the current load of the database server and increasing or decreasing the number of running subprocesses depending on the available system resources. To further optimize performance of load balancing, different techniques may be employed, such as analysis of particular database engines on the levels of scalability when executing different types of queries used in this algorithm, and adjusting the number of concurrent subprocesses based on the optimal values for the engine.

To provide high level of scalability and good performance, synchronization between different concurrent subprocesses should be kept at a minimal level. There are three types of synchronization that must be properly addressed. First, synchronization provided by the discovery manager, which may be required for status reporting, for ability to terminate subprocesses and other goals. Second, explicit synchronization between different subprocesses, which may be needed to protect certain entities that one subprocess uses from other subprocesses. For the claimed algorithm, this should primarily prevent creation of multiple bundle tables concurrently created for the same database table and which could potentially contain non-consistent data. Third, implicit synchronization in a particular database engine caused by various locks or scalability limitations. The algorithm keeps all of the original tables unchanged, and—with explicit synchronization explained in (2), all of the registry and bundle tables can never be modified by more than one subprocess concurrently. This allows the database engine to process the queries with the minimal amount of internal synchronization, though the algorithm can provide additional optimization by using the most appropriate locking mode.

Figure 5:
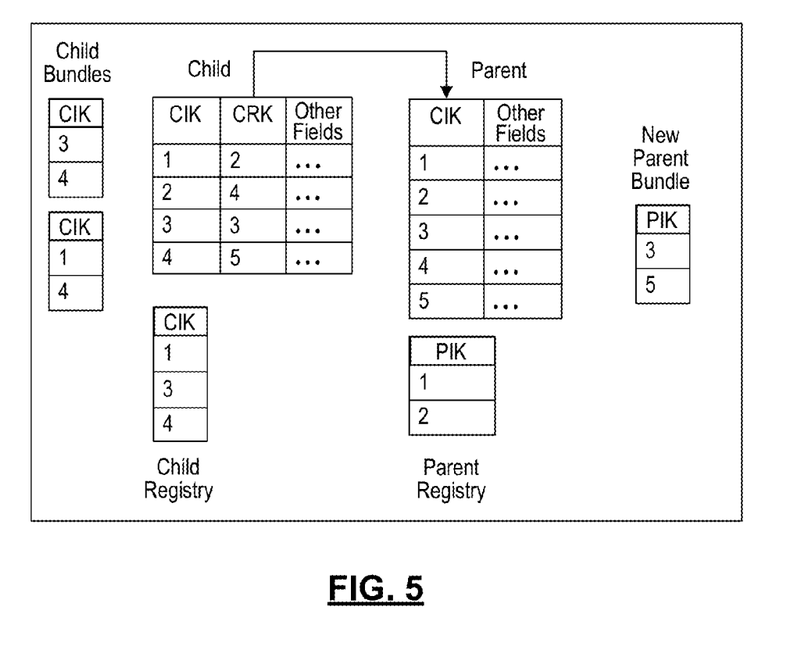
FIG. 5 is a diagram illustrating how to construct a new parent bundle for a child-to-parent relationship.

For a table having a parent relationship with the selected table, the evaluation is further described in relation to FIG. 5. The task is to identify records in the parent table for which there are records in the selected table with a matching foreign key, such that the matching records in the selected table are found in a corresponding bundle table but do not occur in the corresponding registry table for the parent table. In other words, these are records that meet the user's specified extraction criteria but are not yet included in a registry table.

In the example set forth in FIG. 5, the selected table contains records having primary keys with values one, two, three and four. Of these four records, the records having primary keys with values one, three and four are found in the two corresponding bundle tables. Because the record having a primary key with a value of two is not found in the corresponding bundle tables, it is excluded from the query. For the three remaining records in the selected table, there are records in the parent table with a primary key that matches a foreign key in one of the three remaining records of the selected table. That is, records in the parent table having primary keys with values two, three and five match the records in the selected table having primary keys with values one, three and four, respectively. Of these three records, the record in the parent table having a primary key with a value of two already included in a corresponding registry table for the parent table. Thus, the two records in the parent table having primary keys with values three and five meet the user's input criteria but are not yet included in a registry table. These two records in turn form the basis for a new parent bundle table.

In an exemplary embodiment, the records for the new parent bundle table may be identified using a complex join operation executed in the relational database. More specifically, the new parent bundle table is created using inner join operations between the parent table, selected table, and a union of the bundle tables corresponding to the selected table along with an outer join operation to exclude the records already contained in the registry table corresponding to the parent table. In most instances, retrieving records in a single database operation improve performance over conventional approaches, although—depending on the particular database engine—this complex multi-join query can be modified, for example by changing the execution order, splitting in multiple queries or using other generic or engine-specific way of optimizing performance. Other techniques for identifying the records for the new parent bundle table also fall within the broader aspects of this disclosure.

In some embodiments, the database may reside on a database server distinct from the application server. In these embodiments, the execution thread running on the application server executes the join operation or other database query on the database server, thereby offloading most of the processing to the database server. As a result, the execution module may be implemented as a simple application on a computing device having lesser processing capability, such as a cell phone or laptop.

Figure 6:
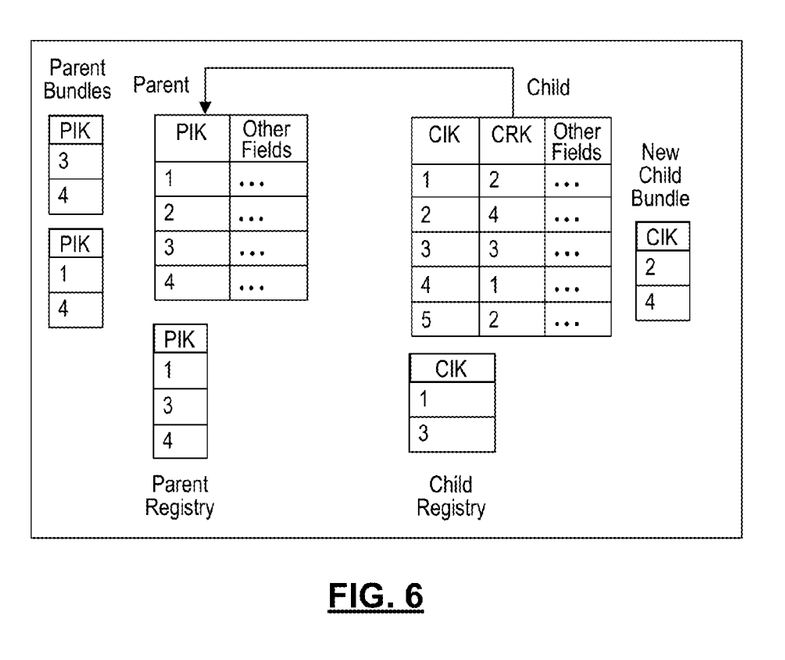
FIG. 6 is a diagram illustrating how to construct a new child bundle for a parent-to-child relationship.

For a table having a child relationship with the selected table, the evaluation is further described in relation to FIG. 6. Similarly, the task is to identify records in the child table having a foreign key that matches a primary key in the selected table, such that the matching records in the selected table are found in a corresponding bundle table but do not occur in the corresponding registry table for the child table. In other words, these are records that meet the user's specified input criteria but are not yet included in a registry table.

In the example set forth in FIG. 6, the selected table contains records having primary keys with values one, two, three and four. Of these four records, the records having primary keys with values one, three and four are found in the two corresponding bundle tables. Because the record having a primary key with a value of two is not found in the corresponding bundle tables, it is excluded from the query. For the three remaining records in the selected table, there are records in the child table with a foreign key that matches a primary key in one of the three remaining records of the selected table. That is, records in the child table having primary keys with values two, three and four match the records in the selected table having primary keys with values one, three and four, respectively. Of these three records, the record in the child table having a primary key with a value of three is already included in a corresponding registry table for the child table. Thus, the two records in the child table having primary keys with values two and four meet the user's input criteria but are not yet included in a registry table. These two records in turn form the basis for a new child bundle table.

In an exemplary embodiment, the records for the new parent bundle table may be identified using a complex join operation executed in the relational database. More specifically, the new child bundle table is created using an inner join operation between the child table, the selected table, and a union of the bundle tables corresponding to the selected table along with an outer join operation to exclude the records already contained in the registry table corresponding to the child table. Again, retrieving records in a single database operation improve performance over conventional approaches although other techniques for identifying the records for the new child bundle table also fall within the broader aspects of this disclosure.

With continued reference to FIG. 4, subprocessing is continued once a new bundle table is created. First, records from the new bundle table (either parent or child) are inserted into the corresponding registry table as indicated at 54. Second, the records from the new bundle table (parent or child) are added to the listing of tables as indicated at 56. Another table is selected from the listing of table at 57 and the process is repeated for each selected table. In this way, the discovery manager can process multiple tables concurrently. When there are no further tables in the listing of tables, a determination is made at 58 to ensure that none of the subprocesses spawned in step 50 remain active. An active subprocess can add tables to the listing of tables, thereby necessitating this check. If there are any such active threads, the process enters a wait state before proceeding to step 59 once the threads terminate. When there are no further tables in the listing of tables and all of the subprocesses have terminated, the iterative process is complete as indicated at 46.

Additional records may be retrieved at 55 for inclusion in the extracted superset of data. All of the records from the parent or child table that match the primary key of the records in the new parent or child bundle table are retrieved at 55 for inclusion in the extracted superset of data. Once the subprocess is complete, notification may be sent to the discovery manager. This type of data extraction can also be done in a separate asynchronous subprocess which—similar to the discovery manager—provides load balancing and synchronization for the extraction tasks. Additionally, the extraction process may involve sanitizing the data or otherwise replacing production data with test data.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for constructing a minimum superset of data from a relational database, comprising:
   receiving an input data set;
   compiling a listing of tables in a relational database, where each table in the listing of tables stores data from the input data set;
   creating a bundle table for each of the tables in the listing of tables, where each bundle table is comprised of an identification key from a corresponding table in the listing of tables and includes applicable records from the input data set;
   creating a registry table for each of the tables in the listing of tables, where each registry table is comprised of an identification key from a corresponding table in the listing of table;
   a) selecting a given table in the listing of tables;
   b) identifying other tables in the listing of tables that correspond to the given table;
   c) merging the other tables with the given table to form a selected table;
   d) removing the selected table from the listing of tables;
   e) determining, for the selected table, related tables having either a parent or child relationship with the selected table in the relational database;
   f) for each of the related tables, determining, whether a corresponding registry table has been created and creating a corresponding registry table in response to the determination that a registry table has not yet been created;
   g) for each table having a parent relationship with the selected table, creating a parent bundle table, inserting the identification keys from the parent bundle table into the corresponding registry table for the parent table, and adding the parent bundle table to the listing of tables, where parent bundle table includes identification keys from the parent table for which there occurs records in the selected table with a matching foreign key and an identification key in the corresponding bundle table for the selected table but do not occur in a corresponding registry table for the parent table;
   h) for each table having a child relationship with the selected table, creating a child bundle table, inserting the identification keys from the child bundle table into the corresponding registry table for the child table, and adding the child bundle table to the listing of tables, where the child bundle table includes identification keys from records in the child table having a foreign key that matches a primary key in the selected table and an identification key in the corresponding bundle table for the selected table but do not occur in a corresponding registry table for the child table; and
   repeating steps a) through h) until the listing of tables is empty, where each of the steps are executed by a computer processor of a computing device.

2. The method of claim 1 further comprises creating a parent bundle table using a join operation in the relational database.

3. The method of claim 2 further comprises executing the join operation on a database server that is distinct from the computing device.

4. The method of claim 1 further comprises creating a child bundle table using a join operation in the relational database.

5. The method of claim 4 further comprises executing the join operation on a database server that is distinct from the computing device.

6. The method of claim 1 further comprises compiling, after the listing of tables is empty, the registry tables to form a minimum superset of data for the relational database.

7. The method of claim 4 wherein creating a parent bundle table further comprises retrieving records in the parent table that match identification keys in the parent bundle table and inserting data from the retrieved records into the corresponding registry table.

8. The method of claim 4 wherein creating a child bundle table further comprises retrieving records in the child table that match identification keys in the child bundle table and inserting data from the retrieved records into the corresponding registry table.

9. The method of claim 1 wherein the steps g) and h) are executed asynchronously from remainder of steps.

10. A computer-implemented method for constructing a minimum superset of test data from a relational database, comprising:

receiving an input data set;

compiling a listing of tables in a relational database, where each table in the listing of tables stores data from the input data set;

creating a bundle table for each of the tables in the listing of tables, where each bundle table is comprised of a primary key from a corresponding table in the listing of tables and includes applicable records from the input data set;

creating a registry table for each of the tables in the listing of tables, where each registry table is comprised of a primary key from a corresponding table in the listing of table;

a) selecting a given table in the listing of tables;

b) removing the selected table from the listing of tables;

c) determining, for the selected table, related tables having either a parent or child relationship with the selected table in the relational database;

d) for each of the related tables, determining, whether a corresponding registry table has been created and creating a corresponding registry table in response to the determination that a registry table has not yet been created;

e) for each table having a parent relationship with the selected table, creating a parent bundle table, inserting the primary keys from the parent bundle table into the corresponding registry table for the parent table, and adding the parent bundle table to the listing of tables, where parent bundle table includes primary keys from the parent table for which there occurs records in the selected table with a matching foreign key and a primary key in the corresponding bundle tables for the selected table but do not occur in a corresponding registry table for the parent table;

f) for each table having a child relationship with the selected table, creating a child bundle table, inserting the primary keys from the child bundle table into the corresponding registry table for the child table, and adding the child bundle table to the listing of tables, where the child bundle table include primary keys from records in the child table having a foreign key that matches a primary key in the corresponding bundle tables for the selected table but do not occur in a corresponding registry table for the child table;

repeating steps a) through f) until the listing of tables is empty, where each of the steps are executed by a computer processor of a computing device; and compiling, after the listing of tables is empty, the registry tables to form a minimum superset of test data for the relational database.

11. The method of claim 10 wherein selecting a given table further comprises identifying other tables in the listing of tables that correspond to the given table and merging the other tables with the given table to form a selected table.

12. The method of claim 10 further comprises creating a parent bundle table using a join operation in the relational database.

13. The method of claim 12 further comprises executing the join operation on a database server that is distinct from the computing device.

14. The method of claim 10 further comprises creating a child bundle table using a join operation in the relational database.

15. The method of claim 14 further comprises executing the join operation on a database server that is distinct from the computing device.

16. The method of claim 11 wherein creating a parent bundle table further comprises retrieving records in the parent table that match primary keys in the parent bundle table and inserting data from the retrieved records into the corresponding registry table.

17. The method of claim 11 wherein creating a child bundle table further comprises retrieving records in the child table that match identification keys in the child bundle table and inserting data from the retrieved records into the corresponding registry table.

* * * * *